US012393697B2

(12) United States Patent
Nalluri et al.

(10) Patent No.: US 12,393,697 B2
(45) Date of Patent: *Aug. 19, 2025

(54) SYSTEMS AND METHODS FOR PERFORMING VULNERABILITY ASSESSMENT ON PARTIALLY FUNCTIONAL APPLICATIONS

(71) Applicant: Citibank, N.A., New York, NY (US)

(72) Inventors: Suryaprakash Nalluri, Aubrey, TX (US); Dathathreya Chary Yaswada, Irving, TX (US); Pranita Santosh Patil, The Colony, TX (US)

(73) Assignee: Citibank, N.A., New York, NY (US)

(*) Notice: Subject to any disclaimer, the term of this patent is extended or adjusted under 35 U.S.C. 154(b) by 202 days.

This patent is subject to a terminal disclaimer.

(21) Appl. No.: 18/361,144

(22) Filed: Jul. 28, 2023

(65) Prior Publication Data

US 2024/0354421 A1  Oct. 24, 2024

Related U.S. Application Data

(63) Continuation of application No. 18/303,545, filed on Apr. 19, 2023, now Pat. No. 11,763,007.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 7,975,296 | B2* | 7/2011 | Apfelbaum | G06F 21/577 726/25 |
| 2010/0318970 | A1* | 12/2010 | Grechanik | G06Q 10/06 717/124 |
| 2011/0093955 | A1* | 4/2011 | Chen | G06F 21/577 726/25 |
| 2019/0114435 | A1* | 4/2019 | Bhalla | G06F 21/55 |
| 2020/0159525 | A1* | 5/2020 | Bhalla | G06F 21/577 |
| 2021/0141711 | A1* | 5/2021 | Leibman | G06F 8/658 |
| 2021/0382816 | A1* | 12/2021 | Chapagain | G06F 11/3698 |
| 2023/0065530 | A1* | 3/2023 | Mohanty | H04L 41/082 |

* cited by examiner

*Primary Examiner* — Meng Li
(74) *Attorney, Agent, or Firm* — Foley & Lardner LLP

(57) ABSTRACT

Systems and methods are described herein for performing vulnerability assessment on partially functional software applications (e.g., software applications currently at a phase in the development cycle prior to a user acceptance testing phase). By doing so, the system may detect vulnerabilities, if any, more easily based on the fewer functional components of the application. Additionally or alternatively, curing any vulnerabilities will require fewer modifications to the application's software, architecture, and/or intended functionality (as these characteristics are also earlier in their development cycle).

24 Claims, 10 Drawing Sheets

```
UsernameControls
@access_control
Feature: Username Validation Testcases  ← 152
Verify that the application contains no access control vulnerabilities Background:
    Given a new browser or client instance
    When the default user logs in
    Then the given user should be logged in @username-is-not-credit-card-number-0066 @username_validation
Scenario: 0066 - Username for application is not a credit card number
    Then the username does not match a credit-card-number
              ↳ 154

@username-is-not-email-0074 @username_validation
Scenario: 0074 - Username for application is not an email
    Then the username does not match a email @username-is-not-social-security-number-0133 @username_validation
Scenario: 0133 - Username for application is not a social security number.
    Then the username does not match a social-security-number.
```

@siteminder

@siteminder-url-redirect-before-authentication-0089

Scenario: 0088 - Siteminder should not allow redirection to un-authorized sites before authentication
And the login page is displayed
Then the <method> request URL containing <urlSearchCriteria> should not redirect to <location> with the edited parameter <target>
Examples:
| method | urlSearchCriteria | location | target |
| GET | siteminderagent | www.google.com |
TARGET=%2f%2fwww.google.com/ |
Example of single signon not being allowed to access malicious code

```
@mfa-bypass-invalidChars-0351
Scenario Outline: Bypass Multifactor Authentication by modifying OTP input data
Given a customer is submitting the loan application
When on the Click of the Submit trigger the Multifactor Authentication screen
Then input special characters in <OTP>
Examples:
|OTP|
|****| 
```
← 172

```
@mfa-bypass-forcefulBrowsing-0351
Scenario Outline: Bypass Multifactor Authentication via forceful browsing
Given a customer access high-risk-transaction functionality
```
← 174

```
#And the customer is submitting the loan application
When the user clicks of the Apply trigger the Multifactor Authentication
And Multifactor OTP Screen is provided
Then forcefully browse to the URL "<URL>"
URL
| www.example.com/abc?paramName=paramValue |
```

@citirisk-cwe-306
Scenario: The application should maintain proper access controls
When the access control scanner is run
And the following false positives are removed
    | url | parameter | cweId | wascId |
Then no Medium or higher risk vulnerabilities should be present @citirisk-auth_lockout
Scenario: Enforce account lockout policies
Given a scanner with all policies disabled
And the context is imported
And a new browser or client instance
And the client/browser is configured to use an intercepting proxy
And the lockout user attempts to log in with an incorrect password enough times to lockout the account
And the user attempts to log in through their configured credentials
Then the given user should be logged out

FIG. 1F

SYSTEMS AND METHODS FOR PERFORMING VULNERABILITY ASSESSMENT ON PARTIALLY FUNCTIONAL APPLICATIONS

CROSS-REFERENCE TO RELATED APPLICATION(S)

This application is a continuation of U.S. patent application Ser. No. 18/303,545, filed Apr. 19, 2023. The content of the foregoing application is incorporated herein in its entirety by reference.

BACKGROUND

Vulnerability assessment is a process of evaluating security risks in, and security threats to, a software application. Vulnerability assessment performs this by identifying one or more vulnerabilities, which may comprise any characteristic of the application (e.g., current security procedures or protocols, design elements, code implementations, and/or any internal controls) that may allow an unauthorized party to access the application (or function thereof) or otherwise violate the application's security.

In conventional software development, vulnerability assessment is performed following a user acceptance (or "beta") testing phase. Vulnerability assessment is performed at this phase as this is the phase in the development cycle in which the application is sufficiently complete and is thus ready for its intended use by its intended users. More specifically, the application, at this point is development, is functional to the extent that business logic errors, race condition checks, and/or zero-day vulnerabilities may be detected. Additionally, at this point in development, the application is able to communicate with a dynamic application security testing ("DAST") tool in order for the tool to identify potential security vulnerabilities in the application and any architectural weaknesses in the application.

Notably, DAST tools require an application to be sufficiently complete and fully capable of performing its intended functions as the DAST tools will attempt to detect vulnerabilities in query strings, headers, fragments, verbs (GET/POST/PUT), and DOM injection using crawling parameters, authentication credentials, and/or other predetermined configurations that are based on the intended functions. An application that is only partially functional may not respond to queries by the DAST tools or may respond in a different manner than if the application is fully functional.

However, performing vulnerability assessment testing once an application is ready (or near ready) for production (i.e., fully functional) as would be the case for an application in a beta phase creates a fundamental technical problem. Namely, any vulnerabilities that are detected may require a detailed analysis of one or more components of the application to detect the source of the vulnerability, and curing any vulnerabilities may require modifications to the application's software, architecture, and/or intended functionality, which may not only cause other problems and/or vulnerabilities, but which may also cause additional downstream changes to the application's software, architecture, and/or intended functionality.

SUMMARY

Accordingly, systems and methods are described herein for novel uses and/or improvements to vulnerability assessment for software applications. In particular, the systems and methods are described herein for performing vulnerability assessment on partially functional software applications (e.g., software applications currently at a phase in the development cycle prior to a user acceptance testing phase). By doing so, the system may detect vulnerabilities, if any, more easily based on the fewer functional components of the application. Additionally or alternatively, curing any vulnerabilities will require fewer modifications to the application's software, architecture, and/or intended functionality (as these characteristics are also earlier in their development cycle).

To achieve this, the systems and methods need to overcome an initial technical challenge in that the application may not be sufficiently complete and fully capable of performing its intended functions at this phase of development. Accordingly, conventional DAST tools as well as the queries, configurations, and/or test data used by these tools will not be compatible with the application in this early stage of development. To overcome this technical challenge, the systems and methods may retrieve a feature file that comprises rules for testing run-time test traffic for a designated, compartmentalized application feature. For example, a compartmentalized application feature is a feature that is executable based on a single feature branch prior to the feature branch being merged into a main branch.

However, the use of such a feature file creates another novel technical problem. Specifically, as the application feature being tested may not have dependencies on other features (e.g., features enabled after incorporation to the main branch), the application feature requires script code that both provides the functionality of the feature application and generates any security information required to be reflected during the run-time test traffic. Accordingly, the systems and methods use an application feature that includes both function script and security script, which the function script generates run-time test traffic for a function of the application, and the security script generates run-time test traffic for comparison to the feature file for the designated, compartmentalized application feature. By doing so, the systems and methods allow for partially functional software applications to mimic their performance (and run-time traffic) that would be present when the application is sufficiently complete and fully capable of performing its intended functions at the later phase in development.

In some aspects, systems and methods for performing vulnerability assessment on partially functional software applications are described. For example, the system may retrieve a first script set for a first application feature, wherein the first script set executes a first function for a first application feature, wherein executing the first function generates first run-time function traffic. The system may retrieve a second script set for the first application feature, wherein the second script set executes a first security test, wherein executing the first security test generates first run-time security test traffic. The system may determine, based on the second script set, a first feature file for automatically generating a first script vulnerability assessment. The system may generate the first script vulnerability assessment based on executing, using the first feature file, the first script set and the second script set, wherein the first script vulnerability assessment compares the run-time function traffic and the run-time security test traffic to the first feature file. The system may generate native data, for the first script set and the second script set, and assessment data that describes, in a human-readable format, a description of a vulnerability based on the native data.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-F show an illustrative user interface for a vulnerability assessment platform, in accordance with one or more embodiments.

DETAILED DESCRIPTION OF THE DRAWINGS

Figure 1A:
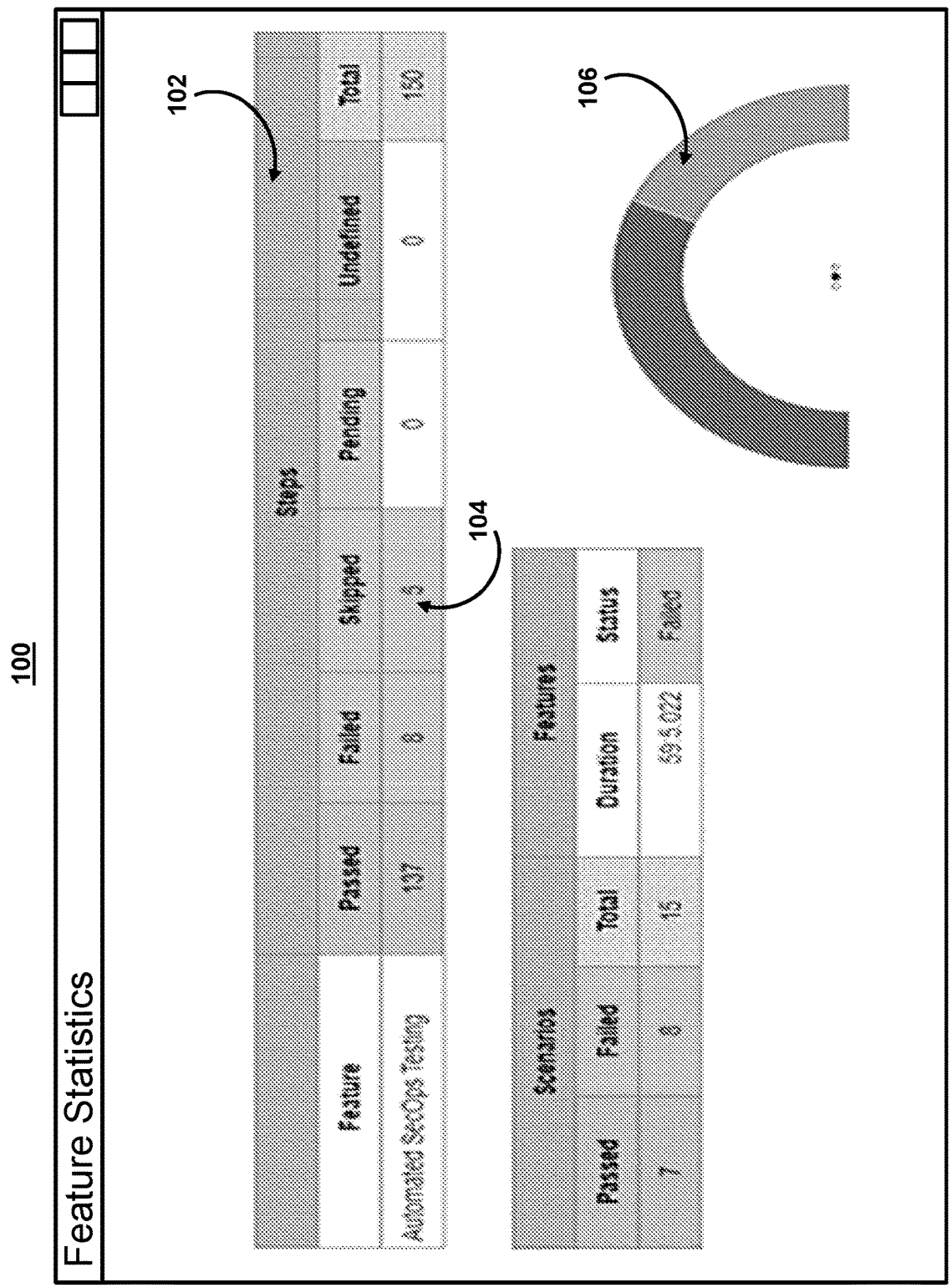

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, the systems and methods provide for improved vulnerability assessment. For example, vulnerability assessment testing is performed at a user acceptance testing phase in an isolated way, which can be time consuming to assess the findings and solution, sometimes introduces significant architecture changes impact time to market. For example, developer's research and spend a considerable amount of time in resolving repetitive security issues (in isolation, one app at a time) and sometimes true root causes are not properly addressed. Additionally, there may be a lack of standardized process for creating and promoting reusable security coding or design patterns. Moreover, Secure Systems Development Lifecycle (SSDLC) lacks codified security checks and security test automation in the pipeline.

The systems and methods account for these deficiencies. For example, the systems and methods automate security testing along with functional testing by automating generic security test cases, providing an extensible framework to automate application specific test cases, and providing plugin framework to integrate with DAST scanner tools and any other custom security tools. As a technical benefit of the systems and methods, security requirements can be interpreted and executed as code to enable a shift left culture, moving security sooner in the development process. Additionally or alternatively, the systems and methods may build a common extendable and reusable security testing framework that can be implemented to all applications which allows developers to create their own security test cases. Additionally or alternatively, the systems and methods may enable developers to leverage security testing framework in their local and pipeline for automated security testing. Additionally or alternatively, the systems and methods may avoid redundant development efforts for common security issues across applications and focus on application specific security checks. Additionally or alternatively, the systems and methods may codify application specific security testing such as privilege escalation, bypass business logic issues etc. in the SDLC using developer friendly frameworks.

Additionally or alternatively, the systems and methods may the functional testing traffic may be flown to the DAST Tool via the framework and automated security scan can be triggered without any added efforts. Additionally or alternatively, the systems and methods may aggregate issues from various modules (Application Specific test suite, Common Security test suite, Plug-in modules) and generate reports in multiple formats such as JSON, HTML, and XML that can be further integrated in to a continuous integration and continuous deployment (CI/ID) pipeline. Additionally or alternatively, the systems and methods may support security testing for web applications, mobile applications, and microservices/APIs.

FIGS. 1A-F show an illustrative user interface for a vulnerability assessment platform, in accordance with one or more embodiments. For example, the systems and methods may provide an extensible framework that automates application specific security testing such as access control testing, Single Sign On criteria, application specific security test cases such as multifactor bypass, unauthorized read/write actions, abuse of business functionality/privileges, etc.

FIG. 1A shows an illustrative user interface for performing vulnerability assessment on partially functional software applications, in accordance with one or more embodiments. For example, the system and methods described herein may generate for display, on a local display device, a user interface for a script vulnerability assessment platform. As referred to herein, a "user interface" may comprise a human-computer interaction and communication in a device and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but it can also be part of a live performance. Furthermore, user-generated content may include content created and/or consumed by a user. For example, user-generated content may include content created by another but consumed and/or published by the user.

User interface 100 may comprise a user interface for a script vulnerability assessment platform. In some embodiments, a script vulnerability assessment platform may include a script vulnerability assessment platform that integrates multiple other script vulnerability assessment platforms (e.g., a script set development control system). Through user interface 100, the script vulnerability assessment platform may receive a first user request to access a first script vulnerability assessment (e.g., assessment 102) and/or perform one or more operations, such as selecting script sets for vulnerability testing and/or applying parameters to the vulnerability testing (e.g., setting independent variables, uploading script sets, and/or selecting output settings). The system may output an assessment that includes a plurality of information types, such as textual information (e.g., information 104), graphical information (e.g., information 106), and/or other information. In some embodiments, user interface 100 may comprise an easily understandable dashboard to provide a description of a vulnerability assessment.

As referred to herein, a "script" may comprise a program or sequence of instructions. In some embodiments, the script may comprise a program or sequence of instructions that are interpreted or carried out by another program rather than by the computer processor (as a compiled program is). A script set may comprise one or more instructions and/or relate to one or more functions performed based on the instructions.

In some embodiments, the script may comprise a code written in a particular language. As referred to herein, code may refer to the set of instructions, or a system of rules, written in a particular programming language (e.g., source code). In some embodiments, code may refer to source code after it has been processed by a compiler and made ready to run on the computer (e.g., the object code). As described herein, source code may be any collection of text, with or without comments, written using a human-readable programming language, usually as plain text. For example, the source code of a program is specially designed to facilitate the work of computer programmers, who specify the actions to be performed by a computer mostly by writing source code. The source code may be transformed by an assembler or compiler (e.g., of the system) into binary machine code that can be executed by the computer. The machine code is then available for execution at a later time. For example, the machine code may be executed to perform one or more functions of an application feature and/or an application.

Figure 1B:
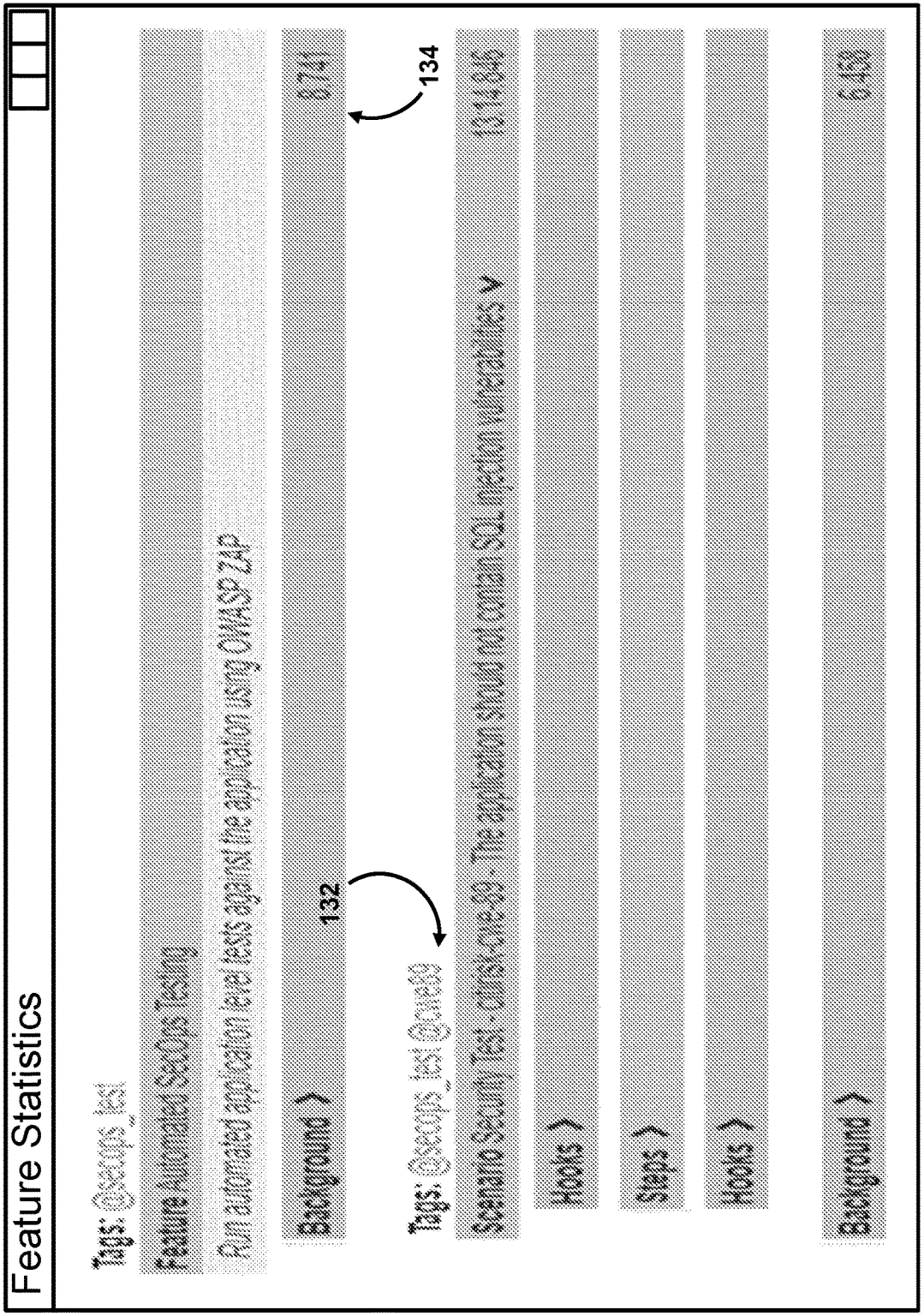

In some embodiments, user interface 100 may allow a user to select one or more script set attributes. Script set attributes may include any characteristic of a script set. These characteristics may comprise a type of data used, an algorithm used, data preparation and/or selection steps, and/or any other characteristic of one script set that distinguishes it from another. The system may also present information about the script development process, as shown in FIG. 1B. For example, the system may present information about users, roles (e.g., role 132), and/or progress indicators for script development (e.g., progress metric 134), as shown in user interface 130.

As shown in FIG. 1B, user interface 130 allows for tracking and mitigating security tests, vulnerability assessments, and/or vulnerability fixes prior to a user acceptance (or "beta") testing phase. For example, vulnerability assessment testing is performed at a user acceptance testing phase in an isolated way, which can be time consuming to assess the findings and solution, sometimes introduces significant architecture changes impact time to market. As described above, developer's research and spend a considerable amount of time in resolving repetitive security issues (in isolation, one app at a time) and sometimes true root causes are not properly addressed. Additionally, there may be a lack of standardized process for creating and promoting reusable security coding or design patterns. Moreover, Secure Systems Development Lifecycle (SSDLC) lacks codified security checks and security test automation in the pipeline. For example, user interface 130 may provide a key functionality to filter the details of script production based on the selection of a domain or a manager making the view specific for their tracking, enabling them to track in an efficient way, perform modifications to a script, and/or run a security test on a script. For example, the system may allow a user to perform a security test prior to performing a pull request for the application feature. A pull request is a mechanism for a developer to notify team members that they have completed a feature. Once their feature branch is ready, the developer files a pull request allowing other developers involved in the application development to know that an application feature is ready for review and merging into a main branch.

In some embodiments, the system may allow a user to designate, retrieve, and/or access a feature file. As referred to herein, a feature file may comprise supplemental data for performing a security test. For example, a feature file may comprise rules for testing run-time test traffic for a designated, compartmentalized application feature. Additionally or alternatively, a feature file may comprise data for supplementing the first application feature to allow the first application to execute the first function. For example, the system may select a first feature file from a plurality of feature files, wherein each feature file of the plurality of feature files comprises data for supplementing the first application feature to allow the first application to execute the first function. As shown in FIG. 1C, user interface 150 may generate for display data related to a script vulnerability assessment platform and/or data of a feature file. For example, user interface 150 may correspond to data related to username controls. For example, the system may ensure, via a vulnerability assessment, that a username does not correspond to a credit card number, email, and/or social security number. For example, in some embodiments, generating a first script vulnerability assessment based on executing, using a first feature file, the first script set and the second script set, comprises the system executing a first security test of the second script set, wherein the first security test comprises a username, determining a result of executing the first security test, and determining a username control vulnerability based on the result.

In some embodiments, a feature file may store features, scenarios, and feature descriptions to be tested. The feature file is an entry point, to write the tests and is used as a live document at the time of testing. The tests of the feature file may comprise a scenario in a Given/When/Then format, which describes various characteristics (e.g., security characteristics) for testing the feature. The file may provide a description of a security test (e.g., description 152) in a descriptive language (e.g., a human-readable text). The file may also comprise an automation test script (e.g., data for supplementing a security test such as variables (e.g., variable 154) to test or supplement in run-time data) as well. A feature file may contain a scenario or may contain many scenarios in a single feature file. Using the feature file, the system may correlate with all source systems, do complex calculations, and automatically generate the run-time traffic data upon which the native data and/or assessment data may be generated.

FIG. 1D shows user interface 160, which may relate to a vulnerability assessment for a single sign on criteria that prevents redirection to unauthorized sites. For example, the system may store native data corresponding to fields of the script vulnerability assessment platform. The native data may include data-related run-time data generated by a first script set that executes a function for the application feature, wherein executing the function generates run-time function traffic (e.g., native data 162). For example, the first script set may comprise a series of steps that the script vulnerability assessment platform iterates through to test the security of any inputted script set by running a function of the script set (e.g., in a black box arrangement). The series of steps may include executing one or more dependencies (e.g., specific operations, functions, etc.) applied while testing an inputted script set. The first script set may also have dependency branches. As the first script set iterates through its dependencies, it may determine to follow one dependency branch over another. For example, each dependency branch may correspond to a particular type of inputted script set, a particular script set attribute of an inputted script set, data inputs of an inputted script set, etc. The dependency branches for the workflow may be comprehensive for any type of inputted script set that is detected. For example, the dependency branches may have branches devoted to every type of script set. Then, for each script set attribute, data input, etc., the system iterates along specific branches (or sub-branches) corresponding to each script set attribute, data input, etc., corresponding to an inputted script set. Through this structure, the script vulnerability assessment platform may receive different types of script sets and provide validations therefor. In some embodiments, the feature file may supplement the current data in the feature application (or script set) by mimicking data and/or a dependency that is not yet available (e.g., due to the early stage of development) for the feature application.

The system may also comprise a script set for the first application feature, wherein the script set executes a security test, wherein executing the security test generates run-time security test traffic. For example, the first script set may comprise a series of steps that the script vulnerability assessment platform iterates through to test the security of any inputted script set by testing security credentials, APIs, certificates, etc. The series of steps may include one or more parameters, operations, functions, etc., to be checked or applied while testing an inputted script set.

For example, in some embodiments, generating a first script vulnerability assessment based on executing, using a first feature file, the first script set and the second script set, comprises the system executing a first security test of the second script set, wherein the first security test comprises redirection to unauthorized sites before authentication, determining a result of executing the first security test, and determining a sign on vulnerability based on the result.

FIG. 1E shows user interface 170, which may relate to a vulnerability assessment for a multi-factor authentication bypass. The vulnerability assessment in user interface 170 may comprise an application specific assessment. User interface 170 also includes native data for a plurality of script sets (e.g., script set 172 and script set 174). Native data or native data formats may comprise data that originates from and/or relates to a respective script set, the script vulnerability assessment platform, and/or their respective plugins. In some embodiments, native data may include data resulting from native code, which is code written specifically for a given script set, the script vulnerability assessment platform, and a respective plugin designed therefor. For example, the system may generate a graph, which may comprise native data. In some embodiments, native data for multiple script sets may be displayed simultaneously (e.g., in a side-by-side comparison).

For example, native data may comprise native data values or native data formats and may further comprise data that originates from and/or relates to a respective script set, the script vulnerability assessment platforms, and a respective plugin designed therefor. In some embodiments, native data may include data resulting from native code, which is code written specifically for the script set development control system, the script set, the script vulnerability assessment platforms, and/or a respective plugin designed therefor. For example, the native data for the first script set and the second script set may comprise respective raw data inputs and/or data outputs and plot views. In some embodiments, the system may determine a first security characteristic of the first application feature using the first script set. The system may determine a second security characteristic of the first application feature using the second script set. The system may determine a difference between the first security characteristic and the second security characteristic. The system may then determine the assessment data based on the difference.

For example, the system may generate a security script set (or benchmark security set) based on the native code and/or dataset of one or more script sets. The security script set may describe a particular security test for a particular feature application. The system may then compare the benchmark script set to the one or more plurality of script sets. For example, the benchmark script set may comprise a script set generated by the system based on the native code and/or dataset of one or more script sets of the previously validated script sets. For example, the native code and/or dataset of one or more script sets may comprise the data set upon which the other script sets were trained, tested, and/or compared. For example, the benchmark script sets may also share one or more script set attributes with the one or more script sets of the previously validated script sets. However, the benchmark script set may also include different script set attributes. For example, the benchmark script set may include a script set attribute (e.g., a specific data preparation, algorithm, architecture, parameter value, etc.) that differs from the one or more script sets of the previously compared script sets. Based on these differences, the benchmark script set may generate different results from the originally validated script set. These differences may then be compared using assessment data. For example, in some embodiments, assessment data may comprise quantitative or qualitative assessments of differences in data.

In some embodiments, native data may include source code for a script set. For example, in some embodiments, the system may allow a user to update and/or edit the source code for an inputted script set. For example, the system may receive a user modification to the source code for an inputted script set and then store the modification to the source code for an inputted script set. The system may then generate for display the inputted script set (or native data for the inputted script set) based on the modification to the source code. For example, the system may allow users having a given authorization to edit source code subject to that authorization. In such cases, the source code may have read/write privileges. Upon generating the source code for display, the system may verify that a current user has one or more read/write privileges. Upon verifying the level of privileges, the system may grant the user access to edit the source code.

User interface 150 may also include other assessment data. Assessment data may be presented in any format and/or representation of data that can be naturally read by humans. In some embodiments, the assessment data may appear as a graphical representation of data. For example, the assessment data may comprise a graph of the first script vulnerability assessment and/or a level of performance of a script set. In such cases, generating the graph may comprise determining a plurality of script vulnerability assessments for different script sets and graphically representing a description of the plurality of script vulnerability assessments. In some embodiments, the description of the native data to the first script vulnerability assessment may comprise a graphical display describing a hierarchal description of the first workflow of script dependencies and the second workflow of script dependencies. For example, the script vulnerability assessment platform may indicate differences and/or provide recommendations for adjustments to an inputted script set. In some embodiments, assessment data may comprise a quantitative or qualitative description of a likelihood that script may be vulnerable to a vulnerability.

For example, the assessment data may be presented in any format and/or representation of data that can be naturally read by humans (e.g., via a user interface such as user interface 100 (FIG. 1A)). In some embodiments, the assessment data may appear as a graphical representation of data. For example, the assessment data may comprise a graph or chart of the first script vulnerability assessment. In such cases, generating the graph may comprise determining a plurality of script sets for generating the first script vulnerability assessment and graphically representing a description of the plurality of script sets (e.g., as shown in FIG. 1A). In some embodiments, the description of the native data to the first script vulnerability assessment may comprise a graphical display describing a description of a result of a security test on a script set.

For example, in some embodiments, generating a first script vulnerability assessment based on executing, using a first feature file, the first script set and the second script set, comprises the system executing a first security test of the second script set, wherein the first security test comprises a multi-factor authentication bypass test, determining a result of executing the first security test, and determining a multi-factor authentication bypass vulnerability based on the result.

FIG. 1F shows user interface 180, which may relate to a vulnerability assessment for access controls. In some embodiments, the assessment data further comprises a recommendation for an adjustment to a script set. The system may recommend one or more adjustments to a script set in order to reduce risk in the script set. For example, the system may generate a recommendation for an adjustment to the script set data input or the second script set attribute. For example, the system may generate a recommendation of an alternative script setting technique (e.g., a different script set attribute) for use in the second script set. Additionally, or alternatively, the assessment data may further comprise an effect of the description on the security characteristic of the first application feature using the second script set. For example, the system may generate a script set attribute that describes an effect of the current script set.

For example, in some embodiments, generating a first script vulnerability assessment based on executing, using a first feature file, the first script set and the second script set, may comprise the system executing a first security test of the second script set, wherein the first security test comprises an access control test, determining a result of executing the first security test, and determining an access control vulnerability based on the result.

Figure 2:
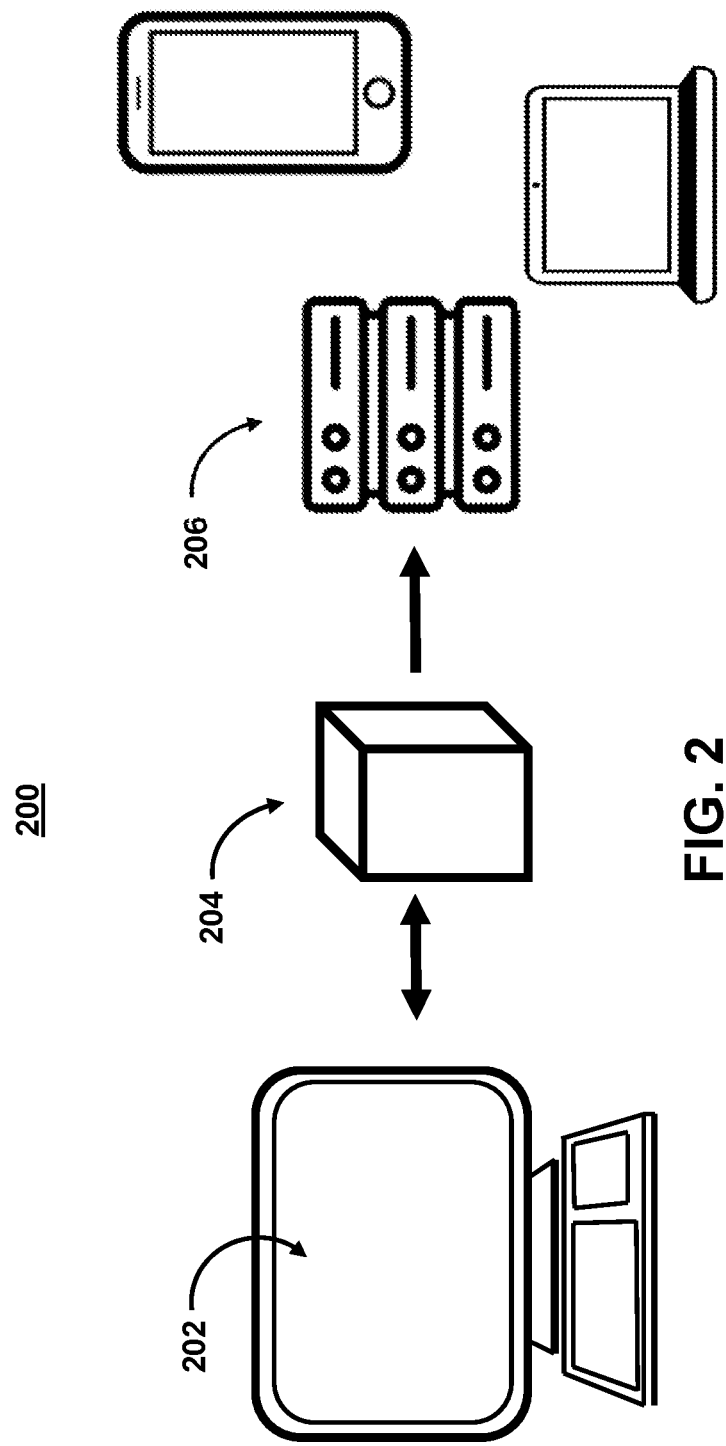
FIG. 2 shows an illustrative diagram of an architecture for an integrated script development and script vulnerability assessment platform, in accordance with one or more embodiments.

FIG. 2 shows an illustrative diagram of an architecture for an integrated script development and script vulnerability assessment platform, in accordance with one or more embodiments. For example, system 200 may provide a system for performing vulnerability assessment on partially functional software applications. For example, system 200 may comprise a user interface for code development and/or code generation. For example, system 200 may receive code (e.g., via user interface 202) for a compartmentalized application feature that is executable based on a single feature branch prior to the feature branch being merged into a main branch.

System 200 also includes engine 204. Engine 204 may generate one or more user interfaces (e.g., as shown in FIGS. 1A-F). Engine 204 may comprise an engine for a fully automated application with end-to-end script development capabilities that may require no manual intervention for tracking and monitoring the lifecycle of script testing. For example, engine 204 may provide testing from the creation of the test script to execution a in a systematic way (e.g., on a release level, month level, manager, organization, etc., on a single platform). Engine 204 assists management in addressing the issues for release management and also in tracking the capacity planning and productivity of the resources in the same space, which may help the entire management in the proper decision-making process by providing information for multiple processes and various sources in one place and allowing monitoring for the entire organization activity without leaving the platform. Engine 204 may also provide users with rich visuals, which not only provide the entire status on a snapshot but also assist in enabling swift decision-making. Engine 204 may also provide a user with the best option to drill down the data on multiple levels for a better understanding of the data and process.

For example, the system may receive a user edit to the assessment data and then store the edited assessment data. The system may then generate for display the edited assessment data subsequently. For example, the system may allow users having a given authorization to edit assessment data subject to that authorization. In such cases, the assessment data may have read/write privileges. Upon generating the assessment data for display, the system may verify that a current user has one or more read/write privileges. Upon verifying the level of privileges, the system may grant the user access to edit the assessment data. For example, the system may receive a user modification to a source code of the first script set. The system may then store the modification to the source code.

Engine 204 may provide a reporting dashboard that transmits information (e.g., via an extension file, HTTPS protocol, and/or URL whitelist) to additional devices 206. Additional devices 206 may comprise web components. Additional devices 206 may transmit certificates from a certificate authority to additional devices 206. Additional devices 206 may then perform further downstream code integration functionality (e.g., merging one branch of code (e.g., corresponding to the application feature) into a main branch). Additionally or alternatively, the systems and methods may aggregate issues from various modules (Application Specific test suite, Common Security test suite, Plug-in modules) and generate reports in multiple formats such as JSON, HTML, and XML that can be further integrated in to CI/ID pipeline.

Figure 3A:
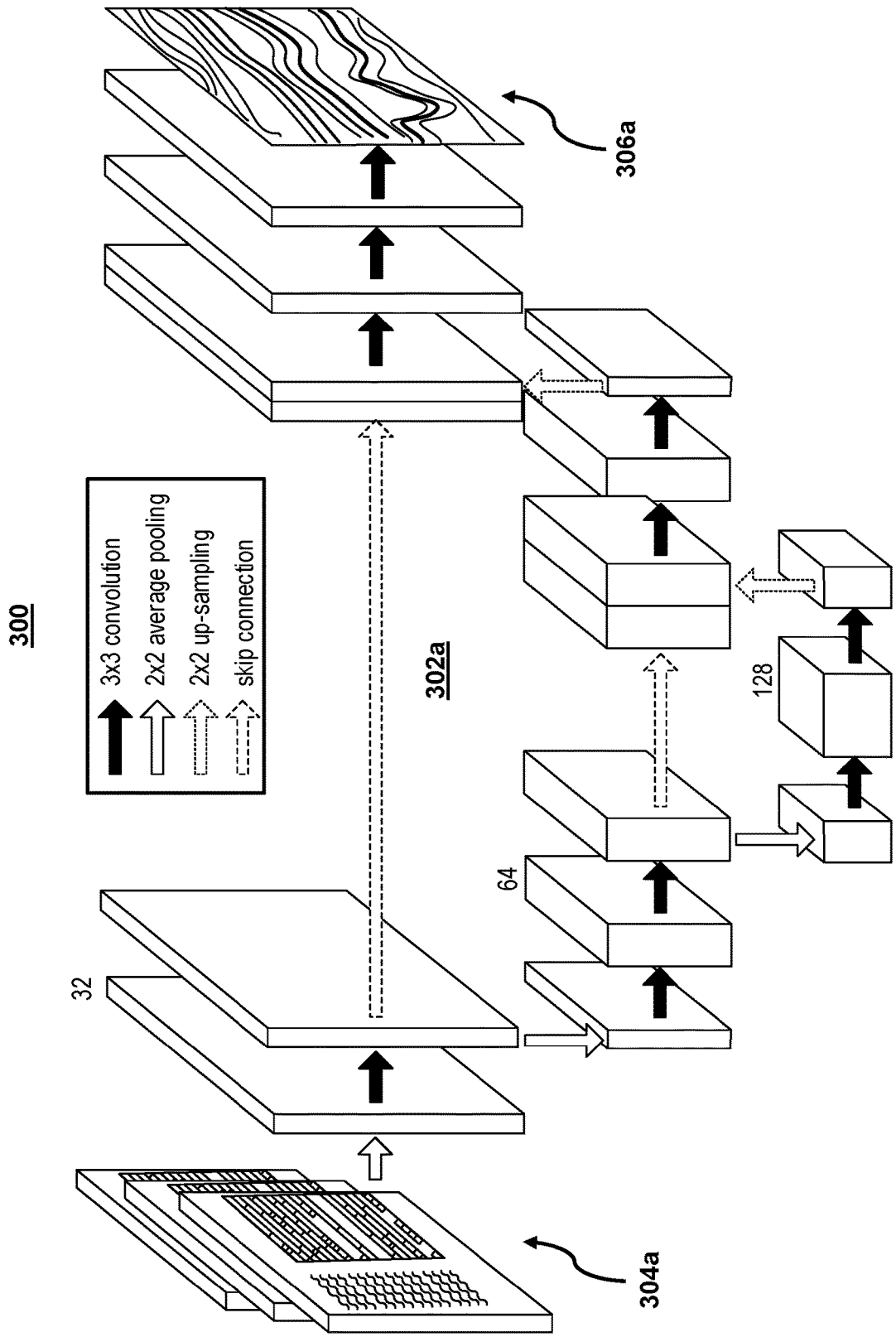
FIGS. 3A-B show illustrative components for a system used to provide an integrated script development and script vulnerability assessment platform, in accordance with one or more embodiments.

FIG. 3A shows illustrative components for a system used to provide an integrated script development and script vulnerability assessment platform, in accordance with one or more embodiments. System 300 includes model 302a, which may be a machine learning model, artificial intelligence model, etc., (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302a (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a script set, first security test, additional information for supplementing the first application's functionality, and/or the run-time test information is generated, etc.). For example, the model may be trained on historic run-time security test traffic that is labeled with known security vulnerabilities.

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302a may be trained to generate better predictions.

In some embodiments, the model (e.g., model 302a) may automatically perform actions based on outputs 306a. In some embodiments, the model (e.g., model 302a) may not perform any actions. The output of the model (e.g., model 302a) may be used to predict a script set, first security test, additional information for supplementing the first application's functionality, and/or the run-time test information is generated, etc.

Figure 3B:
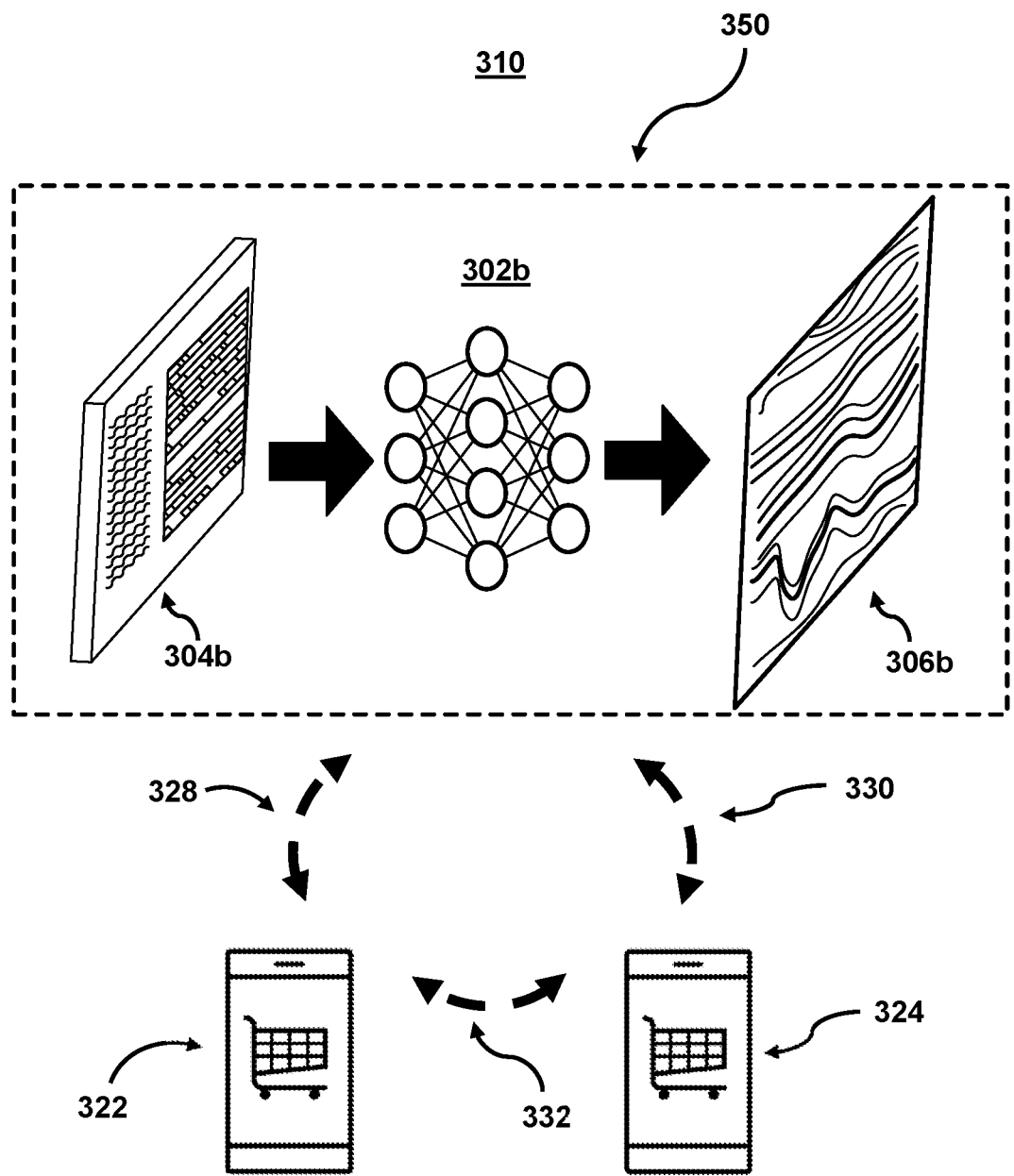

FIG. 3B shows illustrative components for an integrated script development and script vulnerability assessment platform. As shown in FIG. 3B, system 310 may include mobile device 322 and mobile device 324. While shown as a smartphone, respectively, in FIG. 3B, it should be noted that mobile device 322 and mobile device 324 may be any computing device, including, but not limited to, a laptop computer, a tablet computer, a handheld computer, and other computer equipment (e.g., a server), including "smart," wireless, wearable, and/or mobile devices. System 310 may also include cloud components. For example, cloud components may be implemented as a cloud computing system and may feature one or more component devices. It should be noted that while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of mobile device 322 and mobile device 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. Additionally or alternatively, the systems and methods may codify application specific security testing such as privilege escalation, bypass business logic issues etc. in the SDLC using developer friendly frameworks. In some embodiments, API layer 350 may be implemented on mobile device 322 or mobile device 324. Alternatively, or additionally, API layer 350 may reside on one or more of cloud components. API layer 350 (which may be A REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is a strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front end and back end. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem-solving, as compared to traditional computer programs.

During training, an output layer of model 302b may correspond to a classification of model 302b, and an input known to correspond to that classification may be input into an input layer of model 302b during training. During testing, an input without a known classification may be input into the input layer, and a determined classification may be output. For example, the model may be trained on historic run-time security test traffic that is labeled with known security vulnerabilities.

In some embodiments, model 302b may include multiple layers (e.g., where a signal path traverses from front layers to back layers). In some embodiments, backpropagation techniques may be utilized by model 302b, where forward stimulation is used to reset weights on the "front" neural units. In some embodiments, stimulation and inhibition for model 302b may be more free-flowing, with connections interacting in a more chaotic and complex fashion. During testing, an output layer of model 302b may indicate whether or not a given input corresponds to a classification of model 302b (e.g., a script set, first security test, additional information for supplementing the first application's functionality, and/or the run-time test information is generated, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also, as shown, model 302b may comprise fully connected layers that connect every neuron in one layer to every neuron in another layer.

Figure 4:
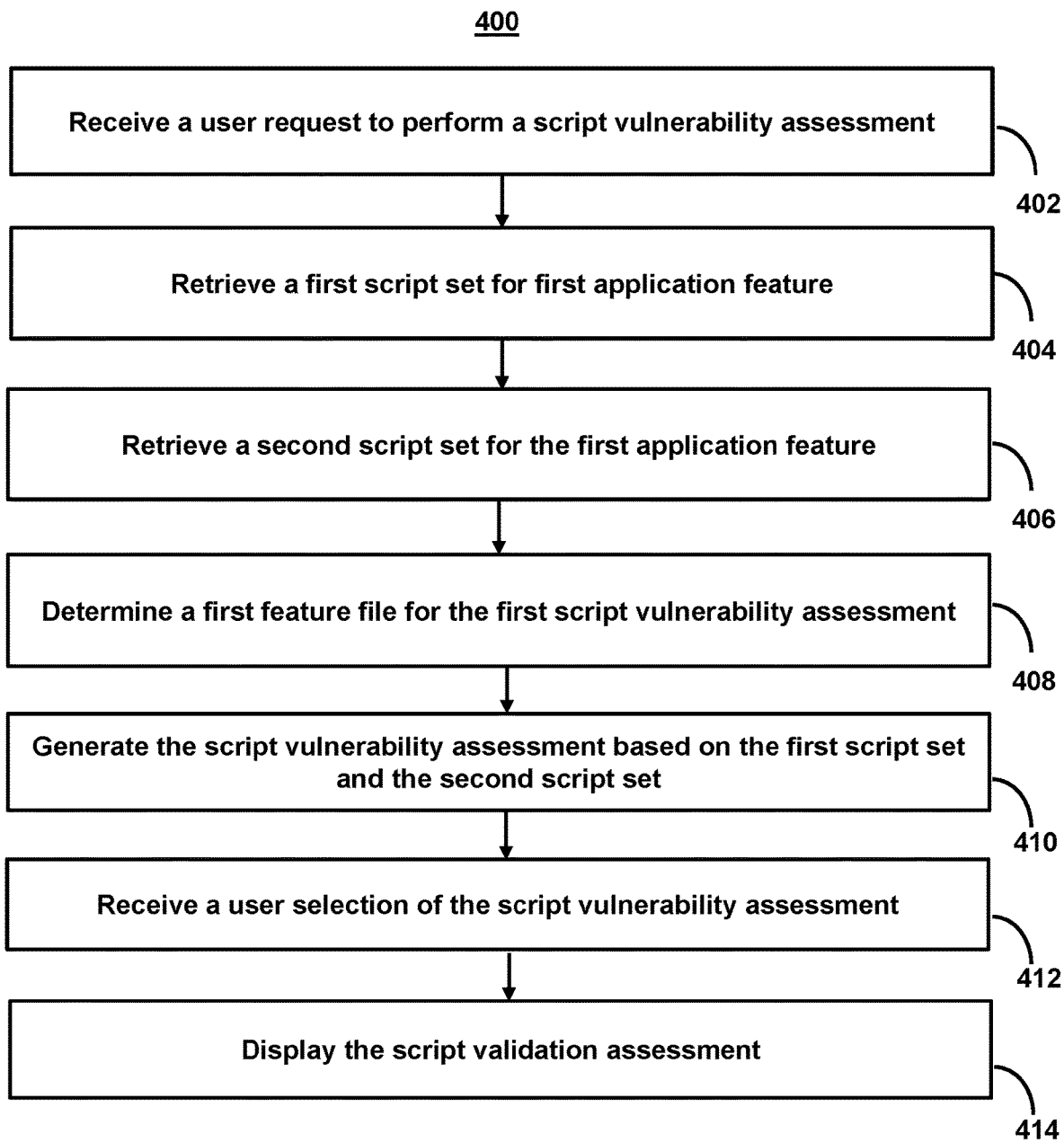
FIG. 4 shows a flowchart of the steps involved in performing vulnerability assessment on partially functional software applications, in accordance with one or more embodiments.

FIG. 4 shows a flowchart of the steps involved in performing vulnerability assessment on partially functional software applications. For example, process 400 may represent the steps taken by one or more devices, as shown in FIG. 2, when performing vulnerability assessment on partially functional software applications. For example, process 400 may relate to a script vulnerability assessment platform that may store native data corresponding to fields of script development and assessment data (e.g., viewable through a user interface (e.g., user interface 100 (FIG. 1A))). Using process 400, security requirements can be interpreted and executed as code to enable a shift left culture, moving security sooner in the development process. Additionally or alternatively, the systems and methods may build a common extendable and reusable security testing framework that can be implemented to all applications which allows developers to create their own security test cases. Additionally or alternatively, the systems and methods may enable developers to leverage security testing framework in their local and pipeline for automated security testing. Additionally or alternatively, the systems and methods may avoid redundant development efforts for common security issues across applications and focus on application specific security checks. Additionally or alternatively, the systems and methods may codify application specific security testing such as privilege escalation, bypass business logic issues etc. in the SDLC using developer friendly frameworks.

At step 402, process 400 receives (e.g., using one or more components as described in FIG. 2) a first user request to perform a first script vulnerability assessment. For example, the system may receive (e.g., via a user interface 100 (FIG. 1A)) a first user request to perform a first script vulnerability assessment, on a first application feature, using a script vulnerability assessment platform. For example, the system may receive a user query to view information about the performance of an application using the script vulnerability assessment platform. Software programming typically involves multiple streams of code interacting with each other to perform different functions. These interactions may comprise instructions for actions to be performed, specific data sources to access, and/or particular conditions to be enforced. As such, even simple software applications comprise numerous code strings with numerous dependencies on other code strings to produce a given result for the application. Given these numerous strings, it is often necessary to determine whether any of the strings may include security vulnerabilities that may put the software at risk. As such, the system may use a vulnerability assessment platform to detect, manage, and cure vulnerabilities. For example, the system may receive a user query for the script vulnerability assessment platform, determine that a response to the user query is based on performing one or more security tests, perform the tests using supplemental data retrieved in a feature file, and generate for display a response based on the security test.

At step 404, process 400 retrieves (e.g., using one or more components as described in FIG. 2) a first script set for the first application feature. For example, the system may retrieve a first script set for the first application feature, wherein the first script set executes a first function for the first application feature, wherein executing the first function generates first run-time function traffic. In some embodiments, the first data script set may comprise source code, instructions, and/or other descriptions for performing a function. For example, the first data script set may include a collection of data values, data fields, the descriptions among them, and the functions or operations that can be applied to the data.

At step 406, process 400 retrieves (e.g., using one or more components as described in FIG. 2) a second script set for the first application feature. For example, the system may retrieve a second script set for the first application feature, wherein the second script set executes a first security test, wherein executing the first security test generates first run-time security test traffic. In some embodiments, the second data script set may comprise source code, instructions, and/or other descriptions for performing a security test. For example, the second data script set may include a collection of data values, data fields, the descriptions among them, and the functions or operations that can be applied to the data.

In some embodiments, the system may use one or more models to determine what information is needed to detect, modify, and/or cure vulnerabilities and/or perform one or more security tests. For example, the system may receive an output of an artificial intelligence model, wherein the artificial intelligence model has been trained on historic run-time security test traffic that is labeled with known security vulnerabilities. The system may detect a vulnerability based on the output. In another example, the system may receive an output of an artificial intelligence model, wherein the artificial intelligence model has been trained to generate supplemental data for supplementing the first application feature to allow the first application to execute a function needed to generate run-time security test traffic.

At step 408, process 400 determines (e.g., using one or more components as described in FIG. 2) a first feature file for the first script vulnerability assessment. For example, the system may determine, based on the second script set, a first feature file for automatically generating the first script vulnerability assessment. The feature file may include additional information for supplementing the first application's functionality and/or the run-time test information is generated. The system may comprise a plurality of feature files that are specific to a given application, function, security test, and/or run-time data.

For example, as the application feature being tested may not have dependencies on other features (e.g., features enabled after incorporation to the main branch), the application feature requires script code that both provides the functionality of the feature application and generates any security information required to be reflected during the run-time test traffic. Accordingly, the systems and methods use an application feature that includes both function script and security script, in which the function script generates run-time test traffic for a function of the application, and the security script generates run-time test traffic for comparison to the feature file for the designated, compartmentalized application feature. By doing so, the systems and methods allow for partially functional software applications to mimic their performance (and run-time traffic) that would be present when the application is sufficiently complete and fully capable of performing its intended functions at the later phase in development. For example, the system may select the first feature file from a plurality of feature files, wherein each feature file of the plurality of feature files comprises data for supplementing the first application feature to allow the first application to execute the first function. The system may retrieve the first feature file.

In some embodiments, the system may perform a security test at a frequency defined by a feature file. For example, the system may execute a first security test of the second script set, wherein the first feature file defines a threshold frequency performing the first security test. The system may determine that a current frequency at which the first security test is performed does not correspond to the threshold frequency. The system may execute the first security test based on determining that the current frequency at which the first security test is performed does not correspond to the threshold frequency.

At step 410, process 400 generates (e.g., using one or more components as described in FIG. 2) the first script vulnerability assessment based on the first script set and the second script set. For example, the system may generate the first script vulnerability assessment based on executing, using the first feature file, the first script set and the second script set, wherein the first script vulnerability assessment compares the run-time function traffic and the run-time security test traffic to the first feature file. For example, the system may receive (e.g., via user interface 100 (FIG. 1A)) a user selection of the first script vulnerability assessment.

In some embodiments, the system may perform a security test comprising a bypass multi-step authentication. For example, a Structured Query Language (SQL) injection, also known as SQLI, is a common attack vector that uses malicious SQL code for backend database manipulation to access information that was not intended to be displayed. This information may include any number of items, including sensitive company data, user lists, or private customer details. During a security test, the system may mimic an attack of this type. For example, the system may execute the first security test of the second script set, wherein the first security test comprises a SQLI attack. The system may determine a result of executing the first security test. The system may determine a SQLI vulnerability based on the result.

In some embodiments, the system may perform a security test comprising a bypass multi-step authentication. For example, a bypass multi-step authentication attack may comprise attackers bypassing a multi-step authentication if the attacker has the user's login credentials. An MFA attack involves bombarding an account owner with MFA push notifications until the owner approves the login request. During a security test, the system may mimic an attack of this type. For example, the system may execute the first security test of the second script set, wherein the first security test comprises a bypass multi-step authentication attack. The system may determine a result of executing the first security test. The system may determine a bypass multi-step authentication vulnerability based on the result.

In some embodiments, the system may perform a security test comprising a path traversal attack. For example, a path traversal vulnerability allows an attacker to access files on a web server to which the attacker should not have access. The attacker may do this by tricking either the web server or the web application running on it into returning files that exist outside of the web root folder. During a security test, the system may mimic an attack of this type. For example, the system may execute a first security test of the second script set, wherein the first security test comprises a path traversal attack. The system may determine a result of executing the first security test. The system may determine a path traversal vulnerability based on the result.

In some embodiments, the system may perform a security test comprising a file inclusion (FI) attack. For example, an FI attack is an attack technique in which attackers trick a web application into either running or exposing files on a web server. FI attacks can expose sensitive information, and in severe cases, may lead to cross-site scripting (XSS) and remote code execution. During a security test, the system may mimic an attack of this type. For example, the system may execute the first security test of the second script set, wherein the first security test comprises an FI attack. The system may determine a result of executing the first security test. The system may determine an FI vulnerability based on the result.

In some embodiments, the system may perform a security test comprising a secure sockets layer (SSL) attack. For example, SSL is a standard security technology for establishing an encrypted link between a server and a client-typically a web server (website) and a browser, or a mail server and a mail client (e.g., e-mail application). An SSL attack targets the SSL handshake protocol either by sending worthless data to the SSL server which will result in connection issues for legitimate users or by abusing the SSL handshake protocol itself. During a security test, the system may mimic an attack of this type. For example, the system may execute a first security test of the second script set, wherein the first security test comprises an SSL. The system may determine a result of executing the first security test. The system may determine an SSL vulnerability based on the result.

In some embodiments, the system may determine a difference in a security characteristic of an application based on the use of different script sets. For example, the system may determine a difference in processing speed based on a first script set as compared to a second script set. By doing so, the system may determine which script sets result in a given security vulnerability. The system may express these differences (or the likelihood that a script may contain a vulnerability) using one or more quantitative (e.g., differences in performance ratios, percentage differences in run-time traffic, etc.) or qualitative measures (e.g., low, medium, high). For example, the system may determine a required security characteristic of the first application feature using the first script set. The system may determine the security characteristic of the first application feature using the second script set. The system may determine a difference between the required security characteristic and the security characteristic. The system may determine the description based on the difference.

In some embodiments, the system may use one or more proxy servers and/or other components to perform a security test. By doing so, the system may minimize the impact of running one or more tests on available computing resources. For example, the system may access a first remote issue link to a first server to execute the first script set. The system may then access a second remote issue link to a second server to execute the first script set.

In some embodiments, the first script vulnerability assessment may comprise a benchmark script set based on the dataset of the second script set. The first script vulnerability assessment may then compare the benchmark script set and the second script set. For example, the benchmark script set may comprise a script set generated by the system based on the second script set data input. The second data input may comprise the data set upon which the second script set was trained, tested, and/or validated. The benchmark script set may also share one or more script set attributes with the second script set. However, the benchmark script set may also include different script set attributes as a result of the dependency branch that is followed. For example, the benchmark script set may include a script set attribute (e.g., a specific data preparation, algorithm, architecture, etc.) that differs from the second script set. The first script vulnerability assessment may then generate the benchmark script set with the one or more different attributes.

In some embodiments, the security characteristic may indicate an amount of risk in a script set. For example, the security characteristic may indicate a level of uncertainty that the outputs of a statistical script set are acceptable with respect to the real data-generating process. That is, the level of confidence may indicate the level of uncertainty that the outputs of the security test indicate a given result.

At step 412, process 400 receives (e.g., using one or more components as described in FIG. 2) a user selection of the first script vulnerability assessment. For example, the system may receive (e.g., via user interface 100 (FIG. 1A)) a user selection of the first script vulnerability assessment. For example, the system may receive (e.g., via user interface 100 (FIG. 1A)) a user selection of a script set attribute. For example, a script set attribute may be selected from several script set attributes. Each script set attribute may be a basic unit of a data script set, such as a link between one or more script sets.

At step 414, process 400 generates (e.g., using one or more components as described in FIG. 2) for display, native data, and assessment data. For example, the system may generate for display, on the user interface, native data based on the first script set and the second script set and assessment data that describes, in a human-readable format, a description of a vulnerability based on the native data. Additionally, or alternatively, the system may then receive a user modification to the source code of the first script set and store the modification to the source code.

For example, native data may comprise native data values or native data formats and may further comprise data that originates from and/or relates to a respective script set, the script vulnerability assessment platforms, and a respective plugin designed therefor. In some embodiments, native data may include data resulting from native code, which is code written specifically for the script set development control system, the script set, the script vulnerability assessment platforms, and/or a respective plugin designed therefor. For example, the native data for the first script set and the second script set may comprise respective raw data inputs and/or data outputs and plot views. In some embodiments, the system may determine a first security characteristic of the first application feature using the first script set. The system may determine a second security characteristic of the first application feature using the second script set. The system may determine a difference in the first security characteristic and the second security characteristic. The system may then determine the assessment data based on the difference.

For example, the assessment data may be presented in any format and/or representation of data that can be naturally read by humans (e.g., via a user interface such as user interface 100 (FIG. 1A)). In some embodiments, the assessment data may appear as a graphical representation of data. For example, the assessment data may comprise a graph or chart of the first script vulnerability assessment. In such cases, generating the graph may comprise determining a plurality of script sets for generating the first script vulnerability assessment and graphically representing a description of the plurality of script sets (e.g., as shown in FIG. 1A). In some embodiments, the description of the native data to the first script vulnerability assessment may comprise a graphical display describing a description of a result of a security test on a script set.

In some embodiments, the assessment data further comprises a recommendation for an adjustment to a script set. The system may recommend one or more adjustments to a script set in order to reduce risk in the script set. For example, the system may generate a recommendation for an adjustment to the script set data input or the second script set attribute. For example, the system may generate a recommendation of an alternative script setting technique (e.g., a different script set attribute) for use in the second script set. Additionally, or alternatively, the assessment data may further comprise an effect of the description on the security characteristic of the first application feature using the second script set. For example, the system may generate a script set attribute that describes an effect of the current script set.

In some embodiments, the system may allow a user to update and/or edit the assessment data. For example, the system may receive a user edit to the assessment data and then store the edited assessment data. The system may then generate for display the edited assessment data subsequently. For example, the system may allow users having a given authorization to edit assessment data subject to that authorization. In such cases, the assessment data may have read/write privileges. Upon generating the assessment data for display, the system may verify that a current user has one or more read/write privileges. Upon verifying the level of privileges, the system may grant the user access to edit the assessment data. For example, the system may receive a user modification to a source code of the first script set. The system may then store the modification to the source code.

In some embodiments, the system may perform numerous tests for different vulnerabilities. For example, the system may receive, via the user interface, a second user request to perform a second script vulnerability assessment, on the first application feature, using the script vulnerability assessment platform. The system may retrieve a third script set for the first application feature, wherein the third script set executes a second security test, wherein executing the second security test generates second run-time security test traffic. The system may determine, based on the third script set, a second feature file for automatically generating the second script vulnerability assessment. The system may generate the second script vulnerability assessment based on executing the first script set and the third script set.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for performing vulnerability assessment on partially functional software applications.

2. The method of any one of the preceding embodiments, the method comprising: receiving, via a user interface, a first user request to perform a first script vulnerability assessment, on a first application feature, using a script vulnerability assessment platform; retrieving a first script set for the first application feature, wherein the first script set executes a first function for the first application feature, wherein executing the first function generates first run-time function traffic; retrieving a second script set for the first application feature, wherein the second script set executes a first security test, wherein executing the first security test generates first run-time security test traffic; determining, based on the second script set, a first feature file for automatically generating the first script vulnerability assessment; generating the first script vulnerability assessment based on executing, using the first feature file, the first script set and the second script set, wherein the first script vulnerability assessment compares the run-time function traffic and the run-time security test traffic to the first feature file; receiving, via the user interface, a user selection of the first script vulnerability assessment; and in response to the user selection of the first script vulnerability assessment, generating for display, on the user interface, native data, for the first script set and the second script set, and assessment data that describes, in a human-readable format, a description of a vulnerability based on the native data.

3. The method of any one of the preceding embodiments, wherein generating the first script vulnerability assessment based on executing, using the first feature file, the first script set and the second script set, further comprises: determining a required security characteristic of the first application feature using the first script set; determining the security characteristic of the first application feature using the second script set; determining a difference between the required security characteristic and the security characteristic; and determining the description based on the difference.

4. The method of any one of the preceding embodiments, wherein generating the first script vulnerability assessment based on executing, using the first feature file, the first script set and the second script set, further comprises: executing the first security test of the second script set, wherein the first security test comprises a Structured Query Language (SQL) injection attack; determining a result of executing the first security test; and determining a SQL injection vulnerability based on the result.

5. The method of any one of the preceding embodiments, wherein generating the first script vulnerability assessment based on executing, using the first feature file, the first script set and the second script set, further comprises: executing the first security test of the second script set, wherein the first security test comprises a bypass multi-step authentication attack; determining a result of executing the first security test; and determining a bypass multi-step authentication vulnerability based on the result.

6. The method of any one of the preceding embodiments, wherein generating the first script vulnerability assessment based on executing, using the first feature file, the first script set and the second script set, further comprises: executing a first security test of the second script set, wherein the first security test comprises a path traversal attack; determining a result of executing the first security test; and determining a path traversal vulnerability based on the result.

7. The method of any one of the preceding embodiments, wherein generating the first script vulnerability assessment based on executing, using the first feature file, the first script set and the second script set, further comprises: executing the first security test of the second script set, wherein the first security test comprises an FI attack; determining a result of executing the first security test; and determining an FI vulnerability based on the result.

8. The method of any one of the preceding embodiments, wherein generating the first script vulnerability assessment based on executing, using the first feature file, the first script set and the second script set, further comprises: executing a first security test of the second script set, wherein the first security test comprises a cross-site scripting (XSS) attack; determining a result of executing the first security test; and determining an XSS vulnerability based on the result.

9. The method of any one of the preceding embodiments, wherein generating the first script vulnerability assessment based on executing, using the first feature file, the first script set and the second script set, further comprises: executing a first security test of the second script set, wherein the first security test comprises a secure sockets layer (SSL); determining a result of executing the first security test; and determining an SSL vulnerability based on the result.

10. The method of any one of the preceding embodiments, wherein generating the first script vulnerability assessment based on executing, using the first feature file, the first script set and the second script set, further comprises: executing a first security test of the second script set, wherein the first feature file defines a threshold frequency performing the first security test; determining that a current frequency at which the first security test is performed does not correspond to the threshold frequency; and executing the first security test based on determining that the current frequency at which the first security test is performed does not correspond to the threshold frequency.

11. The method of any one of the preceding embodiments, wherein generating the first script vulnerability assessment based on executing, using the first feature file, the first script set and the second script set, further comprises: receiving an output of an artificial intelligence model, wherein the artificial intelligence model has been trained on historic run-time security test traffic that is labeled with known security vulnerabilities; and determining a known vulnerability based on the output.

12. The method of any one of the preceding embodiments, wherein generating the first script vulnerability assessment based on executing, using the first feature file, the first script set and the second script set further comprises: accessing a first remote issue link to a first server to execute the first script set; and accessing a second remote issue link to a second server to execute the first script set.

13. The method of any one of the preceding embodiments, further comprising: receiving a user modification to a source code of the first script set; and storing the modification to the source code.

14. The method of any one of the preceding embodiments, further comprising: receiving, via the user interface, a second user request to perform a second script vulnerability assessment, on the first application feature, using the script vulnerability assessment platform; retrieving a third script set for the first application feature, wherein the third script set executes a second security test, wherein executing the second security test generates second run-time security test traffic; determining, based on the third script set, a second feature file for automatically generating the second script vulnerability assessment; and generating the second script vulnerability assessment based on executing the first script set and the third script set.

15. The method of any one of the preceding embodiments, wherein determining, based on the second script set, the first feature file for automatically generating the first script vulnerability assessment further comprises: selecting the first feature file from a plurality of feature files, wherein each feature file of the plurality of feature files comprises data for supplementing the first application feature to allow the first application to execute the first function; and retrieving the first feature file.

16. The method of any one of the preceding embodiments, wherein generating the first script vulnerability assessment based on executing, using the first feature file, the first script set and the second script set, further comprises: executing a first security test of the second script set, wherein the first security test comprises a username; determining a result of executing the first security test; and determining an username control vulnerability based on the result.

17. The method of any one of the preceding embodiments, wherein generating the first script vulnerability assessment based on executing, using the first feature file, the first script set and the second script set, further comprises: executing a first security test of the second script set, wherein the first security test comprises redirection to unauthorized sites before authentication; determining a result of executing the first security test; and determining a sign on vulnerability based on the result.

16. The method of any one of the preceding embodiments, wherein generating the first script vulnerability assessment based on executing, using the first feature file, the first script set and the second script set, further comprises: executing a first security test of the second script set, wherein the first security test comprises a multi-factor authentication bypass test; determining a result of executing the first security test;

and determining a multi-factor authentication bypass vulnerability based on the result.

19. The method of any one of the preceding embodiments, wherein generating the first script vulnerability assessment based on executing, using the first feature file, the first script set and the second script set, further comprises: executing a first security test of the second script set, wherein the first security test comprises an access control test; determining a result of executing the first security test; and determining an access control vulnerability based on the result.

20. A tangible, non-transitory, machine-readable medium storing instructions that, when executed by a data processing apparatus, cause the data processing apparatus to perform operations comprising those of any of embodiments 1-19.

21. A system comprising one or more processors; and memory storing instructions that, when executed by the processors, cause the processors to effectuate operations comprising those of any of embodiments 1-19.

22. A system comprising means for performing any of embodiments 1-19.

What is claimed is:

1. A system for performing vulnerability assessment on partially functional software applications, comprising:
one or more processors; and
a non-transitory, computer-readable medium comprising instructions recorded thereon that, when executed by the one or more processors, cause operations comprising:
receiving, via a user interface, a first user request to perform a first script vulnerability assessment, on a first application feature, using a script vulnerability assessment platform;
retrieving a first script set for the first application feature, wherein the first script set executes a first function for the first application feature, wherein executing the first function generates first run-time function traffic;
retrieving a second script set for the first application feature, wherein the second script set executes a first security test, wherein executing the first security test generates first run-time security test traffic;
selecting a first feature file from a plurality of feature files, wherein each feature file of the plurality of feature files comprises data for supplementing the first application feature to allow the first application to execute the first function; and
generating the first script vulnerability assessment based on executing, using the first feature file, the first script set and the second script set, wherein the first script vulnerability assessment compares the run-time function traffic and the run-time security test traffic to the first feature file.

2. A method for performing vulnerability assessment on partially functional software applications, comprising:
receiving, via a user interface, a first user request to perform a first script vulnerability assessment, on a first application feature, using a script vulnerability assessment platform;
retrieving a first script set for the first application feature, wherein the first script set executes a first function for the first application feature, wherein executing the first function generates first run-time function traffic;
retrieving a second script set for the first application feature, wherein the second script set executes a first security test, wherein executing the first security test generates first run-time security test traffic;
determining, based on the second script set, a first feature file for automatically generating the first script vulnerability assessment; and
generating the first script vulnerability assessment based on executing, using the first feature file, the first script set and the second script set, wherein the first script vulnerability assessment compares the run-time function traffic and the run-time security test traffic to the first feature file.

3. The method of claim 2, wherein generating the first script vulnerability assessment based on executing, using the first feature file, the first script set and the second script set, further comprises:
determining a required security characteristic of the first application feature using the first script set;
determining the security characteristic of the first application feature using the second script set;
determining a difference between the required security characteristic and the security characteristic; and
determining a description based on the difference.

4. The method of claim 2, wherein generating the first script vulnerability assessment based on executing, using the first feature file, the first script set and the second script set, further comprises:
executing the first security test of the second script set, wherein the first security test comprises a Structured Query Language (SQL) injection attack;
determining a result of executing the first security test; and
determining a SQL injection vulnerability based on the result.

5. The method of claim 2, wherein generating the first script vulnerability assessment based on executing, using the first feature file, the first script set and the second script set, further comprises:
executing the first security test of the second script set, wherein the first security test comprises a bypass multi-step authentication attack;
determining a result of executing the first security test; and
determining a bypass multi-step authentication vulnerability based on the result.

6. The method of claim 2, wherein generating the first script vulnerability assessment based on executing, using the first feature file, the first script set and the second script set, further comprises:
executing a first security test of the second script set, wherein the first security test comprises a path traversal attack;
determining a result of executing the first security test; and
determining a path traversal vulnerability based on the result.

7. The method of claim 2, wherein generating the first script vulnerability assessment based on executing, using the first feature file, the first script set and the second script set, further comprises:
executing the first security test of the second script set, wherein the first security test comprises a file inclusion attack; and
determining a result of executing the first security test; and
determining a file inclusion vulnerability based on the result.

8. The method of claim 2, wherein generating the first script vulnerability assessment based on executing, using the first feature file, the first script set and the second script set, further comprises:
  executing a first security test of the second script set, wherein the first security test comprises a cross site scripting (XSS) attack;
  determining a result of executing the first security test; and
  determining an XSS vulnerability based on the result.

9. The method of claim 2, wherein generating the first script vulnerability assessment based on executing, using the first feature file, the first script set and the second script set, further comprises:
  executing a first security test of the second script set, wherein the first security test comprises a secure sockets layer (SSL);
  determining a result of executing the first security test; and
  determining an SSL vulnerability based on the result.

10. The method of claim 2, wherein generating the first script vulnerability assessment based on executing, using the first feature file, the first script set and the second script set, further comprises:
  executing a first security test of the second script set, wherein the first feature file defines a threshold frequency performing the first security test;
  determining that a current frequency at which the first security test is performed does not correspond to the threshold frequency; and
  executing the first security test based on determining that the current frequency at which the first security test is performed does not correspond to the threshold frequency.

11. The method of claim 2, wherein generating the first script vulnerability assessment based on executing, using the first feature file, the first script set and the second script set, further comprises:
  receiving an output of an artificial intelligence model, wherein the artificial intelligence model has been trained on historic run-time security test traffic that is labeled with known security vulnerabilities; and
  determining a known vulnerability based on the output.

12. The method of claim 2, wherein generating the first script vulnerability assessment based on executing, using the first feature file, the first script set and the second script set, further comprises:
  accessing a first remote issue link to a first server to execute the first script set; and
  accessing a second remote issue link to a second server to execute the first script set.

13. The method of claim 2, further comprising:
  receiving a user modification to a source code of the first script set; and
  storing the modification to the source code.

14. The method of claim 2, further comprising:
  receiving, via the user interface, a second user request to perform a second script vulnerability assessment, on the first application feature, using the script vulnerability assessment platform;
  retrieving a third script set for the first application feature, wherein the third script set executes a second security test, wherein executing the second security test generates second run-time security test traffic;
  determining, based on the third script set, a second feature file for automatically generating the second script vulnerability assessment; and
  generating the second script vulnerability assessment based on executing the first script set and the third script set.

15. The method of claim 2, wherein determining, based on the second script set, the first feature file for automatically generating the first script vulnerability assessment further comprises:
  selecting the first feature file from a plurality of feature files, wherein each feature file of the plurality of feature files comprises data for supplementing the first application feature to allow the first application to execute the first function; and
  retrieving the first feature file.

16. A non-transitory, computer-readable medium comprising instructions recorded thereon that, when executed by one or more processors, cause operations comprising:
  retrieving a first script set for a first application feature, wherein the first script set executes a first function for a first application feature, wherein executing the first function generates first run-time function traffic;
  retrieving a second script set for the first application feature, wherein the second script set executes a first security test, wherein executing the first security test generates first run-time security test traffic;
  determining, based on the second script set, a first feature file for automatically generating a first script vulnerability assessment; and
  generating the first script vulnerability assessment based on executing, using the first feature file, the first script set and the second script set, wherein the first script vulnerability assessment compares the run-time function traffic and the run-time security test traffic to the first feature file.

17. The non-transitory, computer-readable medium of claim 16, wherein generating the first script vulnerability assessment based on executing, using the first feature file, the first script set and the second script set, further comprises:
  determining a required security characteristic of the first application feature using the first script set;
  determining the security characteristic of the first application feature using the second script set;
  determining a difference between the required security characteristic and the security characteristic; and
  determining a description based on the difference.

18. The non-transitory, computer-readable medium of claim 16, wherein generating the first script vulnerability assessment based on executing, using the first feature file, the first script set and the second script set, further comprises:
  executing the first security test of the second script set, wherein the first security test comprises a Structured Query Language (SQL) injection attack;
  determining a result of executing the first security test; and
  determining a SQL injection vulnerability based on the result.

19. The non-transitory, computer-readable medium of claim 16, wherein generating the first script vulnerability assessment based on executing, using the first feature file, the first script set and the second script set, further comprises:
  executing the first security test of the second script set, wherein the first security test comprises a bypass multi-step authentication attack;
  determining a result of executing the first security test; and determining a bypass multi-step authentication vulnerability based on the result.

20. The non-transitory, computer-readable medium of claim 16, wherein generating the first script vulnerability assessment based on executing, using the first feature file, the first script set and the second script set, further comprises:
   executing a first security test of the second script set, wherein the first security test comprises a path traversal attack;
   determining a result of executing the first security test; and
   determining a path traversal vulnerability based on the result.

21. The non-transitory, computer-readable medium of claim 16, wherein generating the first script vulnerability assessment based on executing, using the first feature file, the first script set and the second script set, further comprises:
   executing a first security test of the second script set, wherein the first security test comprises a username;
   determining a result of executing the first security test; and
   determining an username control vulnerability based on the result.

22. The non-transitory, computer-readable medium of claim 16, wherein generating the first script vulnerability assessment based on executing, using the first feature file, the first script set and the second script set, further comprises:
   executing a first security test of the second script set, wherein the first security test comprises redirection to unauthorized sites before authentication;
   determining a result of executing the first security test; and
   determining a sign on vulnerability based on the result.

23. The non-transitory, computer-readable medium of claim 16, wherein generating the first script vulnerability assessment based on executing, using the first feature file, the first script set and the second script set, further comprises:
   executing a first security test of the second script set, wherein the first security test comprises a multi-factor authentication bypass test;
   determining a result of executing the first security test; and
   determining a multi-factor authentication bypass vulnerability based on the result.

24. The non-transitory, computer-readable medium of claim 16, wherein generating the first script vulnerability assessment based on executing, using the first feature file, the first script set and the second script set, further comprises:
   executing a first security test of the second script set, wherein the first security test comprises an access control test;
   determining a result of executing the first security test; and
   determining an access control vulnerability based on the result.

\* \* \* \* \*